(12) United States Patent
Serna García-Conde

(10) Patent No.: US 10,822,765 B2
(45) Date of Patent: Nov. 3, 2020

(54) FOUNDATIONS SYSTEM FOR TOWERS AND METHOD FOR INSTALLING THE FOUNDATIONS SYSTEM FOR TOWERS

(71) Applicant: ESTEYCO S.A.P, Madrid (ES)

(72) Inventor: José Salustiano Serna García-Conde, Madrid (ES)

(73) Assignee: ESTEYCO S.A.P., Madrid (ES)

( * ) Notice: Subject to any disclaimer, the term of this patent is extended or adjusted under 35 U.S.C. 154(b) by 0 days.

(21) Appl. No.: 15/316,459

(22) PCT Filed: Oct. 29, 2014

(86) PCT No.: PCT/ES2014/070812
§ 371 (c)(1),
(2) Date: Dec. 5, 2016

(87) PCT Pub. No.: WO2015/185770
PCT Pub. Date: Dec. 10, 2015

(65) Prior Publication Data
US 2017/0152641 A1 Jun. 1, 2017

(30) Foreign Application Priority Data
Jun. 6, 2014 (ES) .................................. 201430879

(51) Int. Cl.
*E02D 27/42* (2006.01)
*F03D 13/20* (2016.01)
*E04H 12/22* (2006.01)

(52) U.S. Cl.
CPC .......... *E02D 27/425* (2013.01); *E02D 27/42* (2013.01); *E04H 12/2269* (2013.01);
(Continued)

(58) Field of Classification Search
CPC ....... E02D 27/425; E02D 27/42; E02D 27/50; E02D 2600/40; E02D 2200/1678;
(Continued)

(56) References Cited

U.S. PATENT DOCUMENTS 1,334,053 A 3/1920 Reynolds
9,096,985 B1 * 8/2015 Phuly ...................... E02D 27/42
(Continued)

FOREIGN PATENT DOCUMENTS

ES        2369304 A1      11/2011
WO    2008/036934 A2      3/2008
WO    2010/019050 A1      2/2010

OTHER PUBLICATIONS

International Search Report received for PCT Patent Application No. PCT/ES2014/070812 dated Feb. 3, 2015, 6 page (3 pages of English Translation of International Search Report and 3 pages of International Search Report).

*Primary Examiner* — Jessica L Laux
(74) *Attorney, Agent, or Firm* — Hayes Soloway PC

(57) ABSTRACT

Foundation system for towers, especially for onshore wind turbines, comprising a central shaft buried or partially buried, preferably hollow and formed by dowels made from precast concrete, an essentially flat lower slab and completely buried, and lateral support means in the form of inclined struts that are joined at their upper end with the central shaft and at its lower end with the lower slab, and that are preferably entirely buried. The wind tower is located on the partly buried main shaft. The foundation system may comprise other lower elements connected with the lower slab, such as radial ribs or peripheral beams. The struts are preferably prefabricated elements incorporating an efficient and economical connection system by pre-stressing. The foundation system maximizes the fraction of the weight of (Continued)

the foundation by gravity generated by soil or ballast material, allowing an important economy in the structural materials of the foundation.

15 Claims, 17 Drawing Sheets

(52) U.S. Cl.
CPC ...... *F03D 13/22* (2016.05); *E02D 2200/1678* (2013.01); *E02D 2250/0046* (2013.01); *E02D 2300/002* (2013.01); *E02D 2600/40* (2013.01)

(58) Field of Classification Search
CPC ...... E02D 2300/002; E02D 2250/0046; E04H 12/00; E04H 12/2269
USPC .................................. 52/294, 295, 296, 297
See application file for complete search history.

(56) References Cited

U.S. PATENT DOCUMENTS

| | | | |
|---|---|---|---|
| 2007/0181767 A1* | 8/2007 | Wobben .................. | E02D 27/42 248/346.01 |
| 2011/0061321 A1* | 3/2011 | Phuly ...................... | E02D 27/42 52/297 |
| 2011/0142682 A1 | 6/2011 | Gevers | |
| 2012/0228442 A1* | 9/2012 | Clifton ................... | F24S 25/10 248/163.1 |
| 2015/0376857 A1* | 12/2015 | Clifton ................... | E02D 27/42 52/292 |

\* cited by examiner

FOUNDATIONS SYSTEM FOR TOWERS AND METHOD FOR INSTALLING THE FOUNDATIONS SYSTEM FOR TOWERS

TECHNICAL FIELD

The present invention relates to a foundation system for wind towers on land or on-shore, and to a method for installing the foundation system for towers according to the invention.

This foundation system for towers and the method for installing the foundation system for towers can be used to support towers or structures of high external loads and/or large dimensions. Preferably, the application scope of the system and method according to the invention is the construction industry and the field of power industry, in particular, wind energy, wherein concrete or metal towers or structures are used. Its application scope is focused on building on-shore towers.

PRIOR ART

Today the vast majority of wind turbines are founded on conventional shoes that work by gravity. This type of foundation consists of a slab of any plan shape (circular, polygonal, etc.) located below the ground on which the structure or tower to be supported must be placed. This slab is usually made of reinforced concrete, concreted in-situ and the concrete amount depends on the external loads acting on the support structure or tower.

This type of foundation, while providing a suitable and proven performance has two major drawbacks. On one hand, in the case that external loads to withstand are high, as usual, the first drawback is its high cost, since it requires a slab of large volume with high measurements of concrete and steel to provide enough weight to support the tipping stresses. Furthermore, assuming high volumes of in-situ construction, it also requires high construction times, which in turn makes its execution more sensitive to weather conditions.

More recently, it has been proposed solutions involving a slab of reinforced concrete that contains radial and essentially flat ribs also made from reinforced concrete (see for example: WO 2010/138978, US2011/0061321 and ES2361358), although this typology has been only used to date in a timely manner. This second type of foundation has the main advantage over the previous one that the radial ribs help to support the external loads from the structure or tower with a smaller volume slab by substituting the concrete weight by soil weight between the ribs, reducing material costs. Furthermore, it is a solution which entails considerable constructive complexity, very long connections between different elements and processes that lend themselves difficult for industrialization.

Finally, there are solutions described in the prior art of wind towers that incorporate elements of lateral support of strut type, as inclined struts or supports connecting the tower to the ground or the foundation, among which those described in documents ES2369304 and EP2444663 should be cited. However, in these solutions the struts are not elements of the foundation system, but part of the not buried structure of the tower, because they are connected at its upper end directly to the tower wall and they are essentially not buried elements; and they are high dimension elements and their handling and construction is complicated.

SUMMARY OF THE INVENTION

The present invention primarily aims to achieve lower costs for foundations, reducing the maximum amount of material, particularly reinforced and pre-stressed concrete to be used, without impairing their basic functions, whether of structural character or to meet the geotechnical needs of the structure. This is accomplished in large measure maximizing the proportion of the total weight of the foundation by gravity obtained from the weight of soil that gravitates on it, the soil being cheap ballast material.

It is also an object of this invention that the constructing and installing method must be easy and fast. To this end, in addition of using less material than any of the foundation types discussed above, many of its elements can be prefabricated, thereby reducing construction time and facilitates in-situ industrialization processes.

The foundation system according to the invention is more efficient and economical than the two types of foundations discussed above, optimizing materials, deadlines and quality of execution, attending and performing all the functions required for the purpose of the tower or structure.

To this end, the foundation system for towers according to the invention has a central shaft located below the base of the tower and can be totally or partially buried in an installed condition; a lower slab of reduced thickness, placed below the central shaft and that is completely buried in an installed condition; and lateral support means, which are completely or partly buried in an installed condition.

The tower can be metallic, in-situ or precast concrete or hybrid according to any method known in the prior art.

The central shaft can be hollow or solid. If the central shaft is hollow, it may be formed by dowels and/or rings that can be prefabricated or concreted in-situ and can be made from concrete, steel or a combination of both. The central shaft may preferably be placed or extended vertically above the ground level, so that it is partially buried, acting as a pedestal that increases the support height of the tower in relation to the ground level. Furthermore, if the center shaft is hollow, it can include at least one door to permit access therein, so that a door in the tower is not necessary. If the central shaft is solid, it should preferably be made from in-situ concrete. The lower slab will also be made essentially from structural concrete.

It should be noted that the connection of the central shaft with the tower can be made according to any method or system known in the prior art, for example: bolts, bars, cables, sleeves, connectors, etc.

Preferably, the lateral support means are connected on one side to the central shaft and on the other to the lower slab and they are formed by at least three struts that are elements of linear and inclined configuration, whose upper end is attached to the central shaft and its lower end to the lower slab, by appropriate linkages, such that each of these ends is at a different level. In this case, the struts are elements that are capable of transmitting both compression loads and tensile loads, and they are completely buried or in a high proportion of its length, preferably over a third of its total length.

The use of this type of struts gives the foundation system a great capacity to withstand the loads induced by the tower and transmit them to the ground, while it becomes possible to generate a high weight on the foundation, allowing to provide the weight needed with a great economy of structural materials, particularly concrete.

The arrangement of the struts is such that between the central shaft, the lower slab and each strut a hollow area is defined, preferably triangular that will be filled, completely or partially, with the ballast material to be disposed on the lower slab to provide the necessary weight to the assembly.

This configuration is therefore a clear distinction from the prior art, permitting to increase the ground level, and thus the stabilizing weight that gravitates on the slab of the foundation system, with only a small increase in material measurements. In addition to this improvement, this configuration allows a greater collaboration of the horizontal thrusts of the ground (on which the tower or structure to be supported must be placed by the foundation system for towers according to the invention) on the central shaft, which allows to withstand better the loads transmitted by the tower.

In a preferred embodiment of the foundation system according to the invention, between the strut and the lower slab there is a rib that is attached at one side to the end of lower attachment of the strut and, on the other end, to the lower slab. The attachment of the rib to the lower slab can be made by any method known in the prior art of structural concrete. Said rib can be integrated into the lower slab and can be above or below it. The configuration of said ribs and struts is preferably radial. Ribs crossing diametrically the lower slab can be used and they are connected to more than one strut.

In another preferred embodiment of the invention, the foundation system has a peripheral beam, not radially arranged, that on one side is attached to the lower slab and that is also attached either directly or through the lower slab, at least to one strut or rib. The attachment of the peripheral beam to the lower slab can be made by any known method in the prior art of structural concrete, or it can even be, as the ribs, a fully integrated or monolithic element with the lower slab. This peripheral beam may be straight or curved, circumferential or polygonal, parallel or not to the perimeter of the lower slab, or beam or cantilever, without being all a closed list of the types of peripheral beams that can be used in the foundation system.

It should be noted that a strut and/or a rib and/or a peripheral beam can be integrated into a single integral support piece, thereby reducing the number of independent elements that are comprised in the system and can enable a greater simplification and industrialization of the construction or assembly processes of the foundation system. Preferably, said integral support piece is prefabricated and its dimensions, as those of any other prefabricated element of the foundation system, are limited for an easy transportation by road.

The lower slab, the ribs if any and the peripheral beams if any are the lower elements of the foundation system, and hereinafter, reference to a lower element of the foundation system will refer to either of them, irrespective if they form part or not of an integral support piece.

The strut, the rib and the peripheral beam, and also the integral support piece, can be prefabricated, which involves great advantages over the prior art, as regards the construction speed and the quality and capacity of industrialization during the manufacturing of such elements, but they can be also executed in situ. As regards the materials used for constructing these elements, even though they will preferably be reinforced or pre-stressed concrete, they could be of any conventional material within the structural scope (such as: structural steel or mixed—steel and concrete—).

The attachment of the strut or rib or peripheral beam or integral support piece or any prefabricated piece, such as e.g. the central shaft, either in the form of dowels or rings, with any other element of the foundation system for towers can be made according to any method known in the prior art of structural engineering; particularly, they can be attached using wet joints for joining and contacting both elements, mortars, grouts, resins or other curable material.

Specifically, as just mentioned, the strut attachment (or an integral support piece containing a strut) to the central shaft or lower element of the foundation system may be done by any method known in the prior art of structural concrete. However, preferably a tensioning system comprising a pre-stressing cable or pre-stressing bar, crossing the strut and inserted into the element to which the strut has to be attached, preferably to the central shaft or the slab bottom or rib or peripheral beam.

In another preferred embodiment, pre-stressing strap type struts are used, preferably in the form of cables or straps, which are intended only for transmitting tensile forces and which are subjected to an initial pre-stressing during construction. In this case, the upper end of strap type strut is attached to the center shaft of the foundation system or the tower itself; the lower end of the strap type strut is preferably attached to a lower element of the foundation system, but it can also be attached directly to the ground, without thereby departing from the scope of the invention.

This foundation system for towers can also have an upper closing slab within the hollow center shaft. Said upper closing slab preferably has a height coincident with the attachment between the struts and the central shaft, improving the structural performance and load transmission between the central shaft and said struts; furthermore, the upper closing slab can provide a platform for installing several devices or equipment, allowing, particularly in the wind sector, to locate electrical equipment necessary for the operation of the turbine. This upper closing slab may be prefabricated or built in-situ with concrete. The central shaft may extend above this upper slab, preferably frustoconical.

The foundation system for towers according to the invention may further comprise elements designed for transmitting loads to the ground or for improving the capacity of the ground. Preferably this can be achieved through piles, micro-piles, ground anchorages, bolts, draining wicks, injections, high pressure injections (jet grouting), stone columns, concrete ground columns or geosynthetics or other systems known in the art.

Furthermore, it is also an object of this invention a method for installing the foundation system for towers according to the invention, and it is characterized in that a more optimized method regarding materials and flexibility in terms of execution that the methods used in the prior art, thanks to the features of the foundation system for towers or similar structures.

This method for installing the foundation system for towers has the following steps that can be carried out in any technically possible order:
  a) Excavating and site preparation for supporting the foundation;
  b) Placing passive and/or active (pre-stressed) armor containing the lower slab, either by separated elements or by modules or rebar cages (armor) previously pre-assembled;
  c) Constructing or installing the central shaft; and the central shaft can be built in-situ or assembled from prefabricated parts;
  d) Filling with soil on the lower slab until it is totally buried;

At any time after step c), either immediately after step c) or after any other step later than step c), the following steps are also carried out, being indifferent their order:
  e) Connecting the central shaft with the lower slab;
  f) Connecting the tower to the central shaft;

g) Connecting the struts with the central shaft and/or the tower;

In addition, prior to step g) at any time before it, the next step:

h) Constructing or installing the struts (or integral support pieces) and ribs or peripheral beams, if any; this step can be divided into stages, which can be or not be interspersed with other steps.

Also, after step b) and at any time thereafter, the next step:

i) Concreting the lower slab.

This method for installing the foundation system for towers can include, as described below, additional steps if the foundation system for towers has prefabricated elements, if the central shaft is hollow and it must be filled, if the central shaft is formed by dowels and/or rings, the ribs and/or peripheral beams are below the lower slab, if it has a pre-stressing system or an upper closing slab.

If the foundation system for towers comprises at least one prefabricated element (either a strut, a rib, a peripheral beam, an integral support piece or prefabricated pieces of the central shaft), the method for installing and constructing the foundation system for towers according to the invention preferably comprises, before step d) at any time before it, prefabricating and transporting to the site at least one prefabricated element of the foundation system. The manufacturing can be carried out in a fixed installation or in mobile or temporary installations located in the vicinity of the work, in order to reduce logistics costs and transportation.

It should be below stood that, if the construction or assembly of the central shaft comprises different phases, step c) can comprise only some of them. The construction of the central shaft may comprise any construction phase executed after step c) without departing from the scope of the present invention.

For example, if foundation system for towers comprises a central hollow shaft with an upper closing slab, the method for installing and constructing a foundation system for towers according to the invention preferably comprises, after step c) and at any time thereafter, step k) of filling with ballast material at least part of the internal part of the central shaft and step l) of constructing or assembling the upper closing slab.

If the foundation system for towers comprises ribs and/or peripheral beams located below the lower slab, the method for installing and constructing a foundation system for towers according to the invention preferably comprises, before step i) and any time before it, step m) consisting of at least digging a trench and the digging bottom of the foundation system to be installed for housing a rib or a peripheral beam, said trench being susceptible of acting as a formwork against the ground if the rib or peripheral beam are constructed with in situ concrete.

If the foundation system for towers comprises prefabricated ribs (or integral prefabricated pieces comprising said ribs) and a lower slab with a central zone of increased thickness or a central shaft constructed from in situ concrete, the method for installing and constructing a foundation system for towers according to the invention preferably comprises, before step i) and at any time before it, placing a formwork template serving as lateral formwork of the central zone with an increased thickness (or central shaft constructed as in situ concrete), while it acts as a template element for positioning and/or fastening the prefabricated pieces of the ribs until the lower slab is concreted.

If the foundation system for towers comprises a central shaft made up of prefabricated pieces, dowels and/or rings, the method for installing and constructing a foundation system for towers according to the invention preferably comprises, before step c) at any time before it, the preassembly of the central shaft or any part thereof having two or more prefabricated pieces in a position different from its final position, including the execution of attachments between prefabricated components for their attachment and the arrangement of charging and/or lifting means for moving and placing the preassembled center shaft (or any part thereof consisting of two or more prefabricated pieces preassembled) on a final status.

If the foundation system for towers includes a pre-stressing system for joining at least one strut with the central shaft and with at least one lower element of the foundation system, the installation method can further comprise the following steps:

threading the pre-stressing cable either top-down or bottom-up, through the sheaths provided in the elements the cable crosses;

fixing the pre-stressing cable to one of said anchorages applying tension to the pre-stressing cable and then fixing the other anchorage.

optionally, filling at least part of a sheath with a material for protecting the pre-stressing cable and/or for adhering it to the elements it crosses.

Bearing in mind that in this case said pre-stressing system shall comprise at least:

a pre-stressing cable in an installed condition longitudinally through said strut, so that its upper end protrudes from the strut and penetrates inside the central shaft and/or the upper closing slab of the central shaft, and its lower end protrudes from the strut and penetrates inside a lower element of the foundation system;

a sheath longitudinally crossing said strut and in its final situation houses part of said pre-stressing cable;

an anchorage of the upper end of the pre-stressing cable which lies in the central shaft or in the upper closing slab of the central shaft;

a sheath, with one or several aligned sections, which allows the passage of the pre-stressing cable from the upper end of said strut to said anchorage through the central shaft and/or upper closing slab;

an anchorage of the lower end of the pre-stressing cable which lies in a lower element of the foundation system;

a sheath, with one or several aligned sections, which allows the passage of the pre-stressing cable from the lower end of said strut to said anchorage through at least one lower element of the foundation system.

Alternatively, a pre-stressing system can be employed, comprising:

a pre-stressing cable in an installed condition longitudinally crossing said strut, so that its upper end protrudes from the strut and penetrates into the central shaft and/or into the upper closing slab of the central shaft, and said lower end protrudes from said strut and penetrates into at least one lower element of the foundation system;

a sheath that longitudinally crosses said strut, which at the final position houses part of said pre-stressing cable and at its upper end includes a curved opening allowing a provisional orientation of the pre-stressing cable at the exit of the sheath that is more vertical than that of the longitudinal axis of the strut;

an anchorage of the upper end of the pre-stressing cable which is placed in the central shaft or in the upper closing slab of the central shaft;

a sheath of one or several aligned sections, which allows the passage of the pre-stressing cable from the upper end of said strut to said anchorage through the central shaft and/or the upper closing slab, and which includes at its lower end a curved opening which allows the pre-stressing cable to penetrate into the sheath with a more vertical orientation than that of the longitudinal axis of said sheath;

an anchorage of the lower end of the pre-stressing cable that is housed in a lower element of the foundation system.

And in this case the installation method of this foundation system for towers also comprises the following steps:

pre-threading said pre-stressing cable through the sheath of said strut, so that part of the cable protrudes from the upper end of said strut;

optionally, prefixing the anchorage at the lower end of pre-stressing cable pre-threaded into the strut;

applying at the protruding part of the pre-stressing cable from the upper end of the strut provisional fastening means allowing temporarily diverting the cable and fixing it in a more vertical orientation than that of the longitudinal axis of the strut;

fixing the pre-stressing cable to one of said anchorages, applying tension to the pre-stressing cable and then fixing it to the other anchorage;

optionally, filling at least part of a sheath with material for protecting the pre-stressing cable and/or for its adherence to the elements it crosses;

and also in this case step c) is carried out after step h) and it includes the suspension and descending to its final position of the prefabricated central shaft or any of the prefabricated pieces thereof, so that the pre-threaded pre-stressing cable in said strut penetrates during said descent into the sheath of the central shaft through the curved opening, allowing the cable to enter with a more vertical orientation than that of the longitudinal axis of the strut.

During this step, access by operators or suitable auxiliary means is enabled to the upper end of the pre-stressing cable to assist in its threading through the sheath during the descent, which can be paused for convenience. It is also possible to use a flexible cap provisionally placed at the upper end of the pre-stressing cable for acting as a guide and facilitating its threading into the sheath.

If the foundation system for towers comprises at least one prefabricated strut, the method for installing and constructing a foundation system for towers according to the invention, preferably, the step h) includes the provision of a clamping bracket which allows regulating and/or temporarily fixing the position of the prefabricated strut.

BRIEF DESCRIPTION OF THE DRAWINGS

The foregoing and other advantages and features will be better below stood from the following detailed description of exemplary embodiments with reference to the accompanying drawings, that must be considered as illustrative and not limiting, in which.

DETAILED DESCRIPTION OF AN EMBODIMENT

Figure 1:
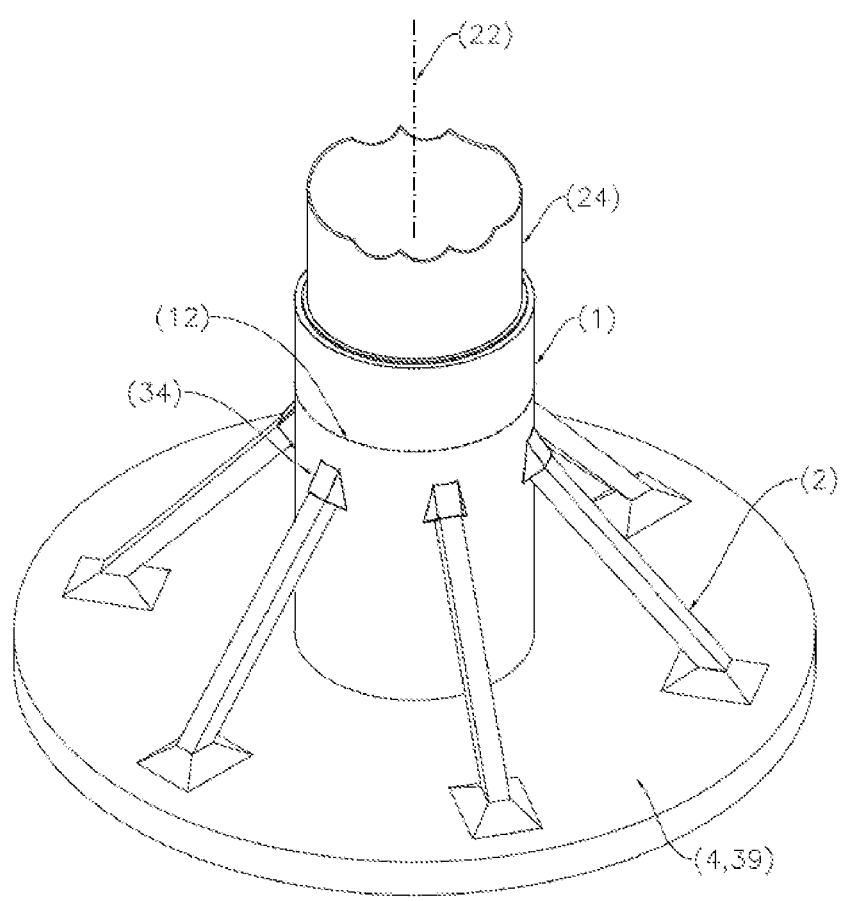
FIG. 1 illustrates the most basic foundation system for towers according to the invention.

FIG. 1 shows the tower foundation system according to the invention in which it can be seen that there are the following elements: a central shaft (1) mostly buried, a lower slab (4) completely buried and lateral support means comprising, in this case six struts (2) also completely buried.

The central shaft (1) is located below the base of the tower (24) so that, preferably, its central vertical axis is essentially coincident with the vertical axis (22) of the tower (24), which in this case it is a tubular metal tower.

The central shaft (1) is cylindrical in this embodiment, but it can be of any shape, and it can be, without being an exhaustive list, circular, polygonal, cylindrical, tapered or with variable tilting of the walls. Also, this central shaft (1) can also be hollow or solid.

The lower slab (4) is located below the central shaft (1) so that, preferably, its center is essentially coincident with the vertical axis of the tower (24) and is completely buried in an installed condition. This lower slab (4) has in this case has a circular plan and is substantially flat. The lower slab (4) may be of constant thickness or may have changing thickness zones as in this case, in which the lower slab has zones of increased thickness at the junctions with the struts (2) acting as a capital.

Said lateral support means are attached in this embodiment both to the central shaft (1) and the lower slab (4) and are buried in an installed condition, but it can also be only partially buried. This lateral support means comprises struts (2) are elements with a linear and inclined configuration, whose longitudinal dimension exceeds its maximum transverse dimension and whose both ends are at a different level, thus defining an upper end and a lower end. The upper end, which is closer to the vertical axis of the tower (24) than the lower end, is connected to the central shaft (1) through attachments.

The struts shown in the embodiment of FIG. 1 are of constant section, but they can also be of variable section, in particular for increasing their dimensions at their ends for connection to the central shaft (1) or lower elements (39) of the foundation system.

This central shaft (1) preferably also comprises at least one protrusion (34) whose position matches one of the joints connecting the strut (2) with the central shaft (1) and whose geometry is such that, in a manner essentially perpendicular to the longitudinal axis of the strut (2), generates a surface for contact or attachment between the central shaft (1) and the strut (2). This protrusion (34) can be obtained through a thickened portion in the wall of the central shaft (1).

Preferably, as in the embodiment shown in FIG. 1, the elements of the foundation system are of reinforced or pre-stressed concrete, which provides high structural ability, durability and reduced susceptibility to fatigue, and can facilitate the prefabrication of such elements.

Figure 2:
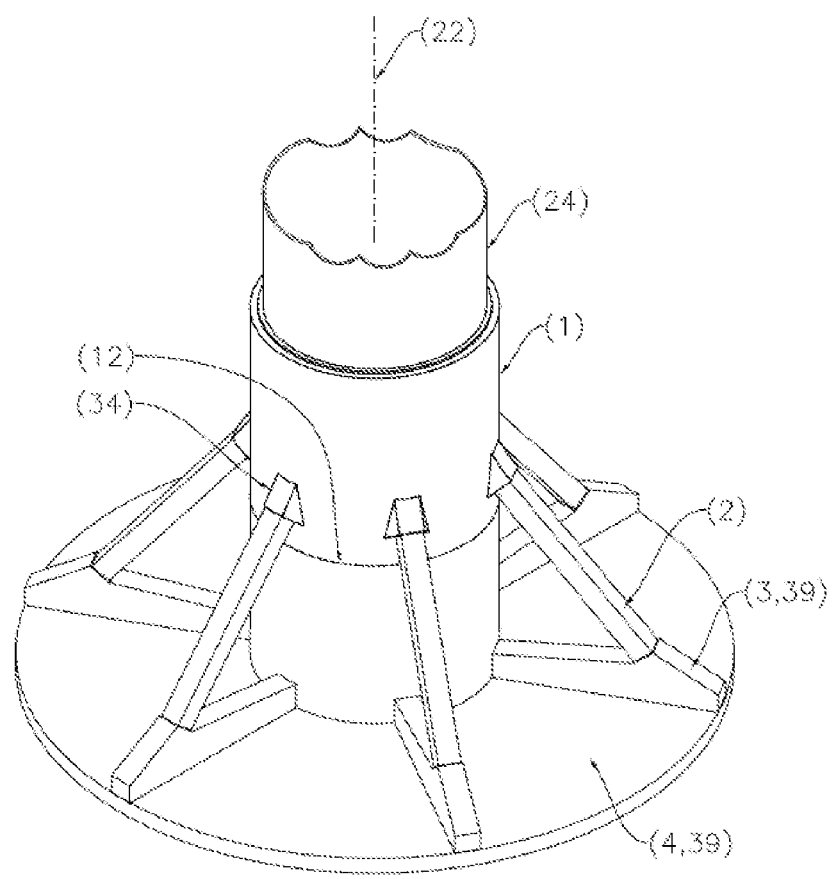
FIG. 2 shows a foundation system for towers according to the invention comprising several ribs.

FIG. 2 shows another preferred embodiment of the foundation system for towers according to the invention comprising at least one rib (3), of linear configuration, with two ends and whose longitudinal dimension exceeds its maximum transversal dimension. The rib (3) is attached to the lower end of a strut (2) and to the lower slab (4); in this case, the ribs (3) are located above the lower slab (4), but they can also be below it. This rib (3) projects laterally so that at least one end is furthest from the vertical axis of the tower than the other non-end end points of the rib (3), preferably in radial direction.

Figure 3:
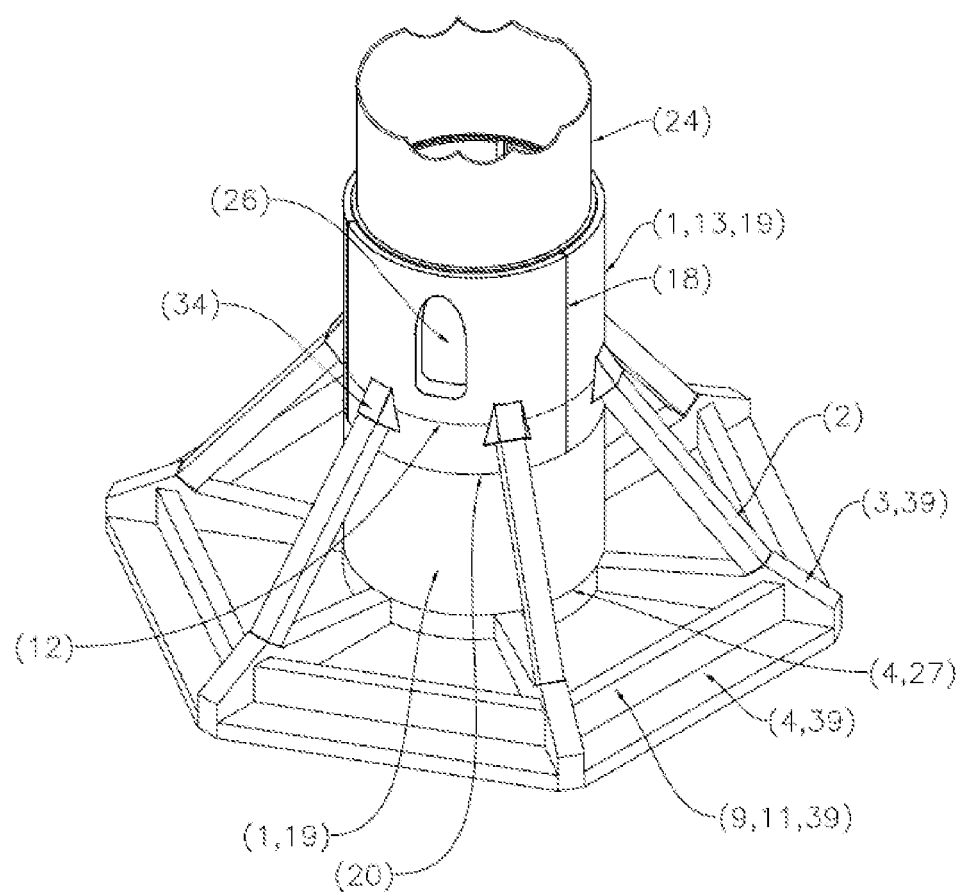
FIG. 3 shows a foundation system for towers according to the invention comprising an upper peripheral beam and wherein the central shaft is constructed with prefabricated rings.

FIG. 3 shows another preferred embodiment of the foundation system for towers according to the invention which is also provided with a peripheral beam (9), in this case an upper one (11), that is, above the lower slab (4); said peripheral beam (9) is of linear configuration and is joined by one side to the lower slab (4) and in this case to the ribs (3). This peripheral beam (9) is preferably placed with a circumferential shape, so that is it kept separated from the central shaft (1) and with a non-radial positioning in relation to the lower slab (4). In this embodiment, the peripheral beams (9) are rectilinear and of constant depth, but their geometry can also be curvilinear or polygonal and their edge can be variable.

Although the geometry of the lower slab (4) is preferably circular, as shown in FIG. 3 among others, it may take any form, as in this case polygonal. Also in FIG. 3 it can seen that the lower slab (4) can have a central increased thickness (27) in which in this case both the central shaft (1) and the ribs (3) are joined.

In this FIG. 3 it can also be seen that the central shaft (1) is constructed from prefabricated dowels (13) connected by essentially vertical joints (18) according to any of the forms used in the prior art, and/or prefabricated rings (19) joined by essentially horizontal joints (20) of any of the forms used in the prior art, thereby facilitating greatly the transportation and installation of the central shaft (1). Alternatively, the central shaft (1) may be of a single piece of metal or concrete, prefabricated or concreted in-situ.

Finally, in FIG. 3 it can be seen that the central shaft (1) can include a step or door (26), thus avoiding the tower (24) to include a door, which simplifies and cheapens its construction. It is also possible that the central shaft has other steps to allow access inside it during the installation process.

Figure 4:
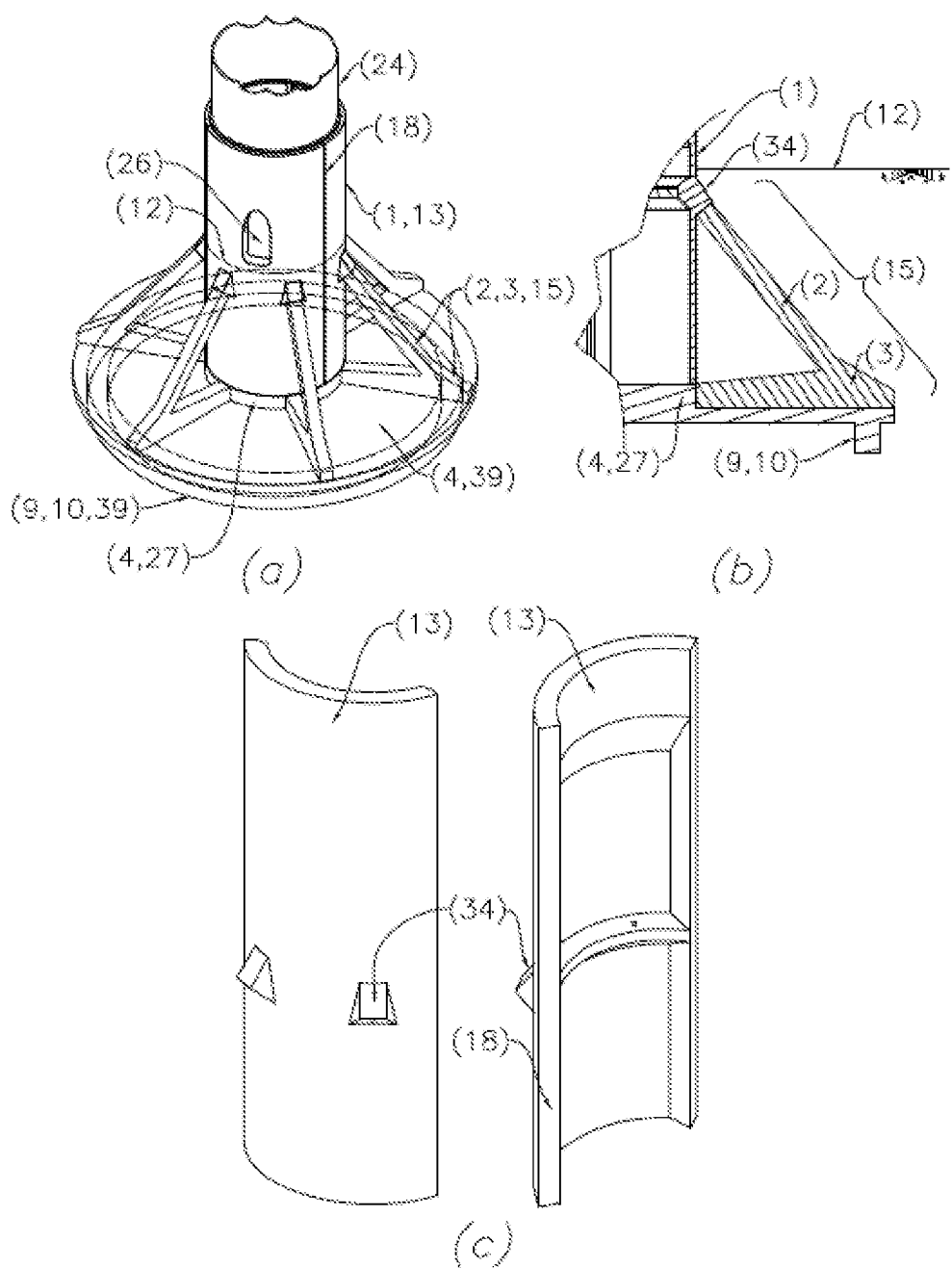
FIG. 4a) illustrates a foundation system for towers according to the invention comprising several integral support pieces (including a strut and a rib) and a lower peripheral beam.
FIG. 4b) shows an enlarged sectional view of an integral support piece attached to the central shaft, to the lower slab and the lower peripheral beam of a foundation system for towers according to the invention.
FIG. 4c) shows a view of the dowel shaped prefabricated pieces that form the central shaft of the foundation system shown in FIG. 4a).

Meanwhile, FIG. 4a illustrates a foundation system for towers according to the invention in which the peripheral beam (9) is a lower one (10), that is, it is placed below the lower slab (4). Also in this FIG. 4a the strut (2) and the rib (3) form part of an integral support piece (15) and the lower slab (4) comprises a central zone of increased thickness (27), in which the central shaft (1) rests, with a thickness greater than the part of the lower slab (4) surrounding it, generating a peripheral side wall of said area (27) which is connected laterally at least to one rib (3), which in this case is part of an integral support piece (15).

Also, in FIG. 4a it can be seen that the central shaft (1) of the foundation system is likely to be extended above the ground level (12) so as to be partially buried. Thus, the central shaft acts as a pedestal with increased capacity and robustness that can raise from the support level of the base of the tower (24), in this case metallic, which finely may permit increasing the height of the wind turbine and thereby increasing the energy production without need for taller towers.

FIG. 4b shows a sectioned and enlarged view of the integral support piece (15) which integrates a strut (2) and a rib (3) and which is connected both to the central shaft (1) through the protrusion (34) and to the lower slab (4). It can be appreciated that all the lower elements (39) of the foundation system are buried. In this case the integral support piece (15) is also completely buried.

In FIG. 4c is shown from two perspectives one of the dowels (13) of precast concrete forming part of the central shaft (1) and which joins to other dowels through a vertical joint (18). It can be appreciated that such dowels can include reinforced or thickened areas, and in particular the protrusions (34) for joining the central shaft (1) to the struts (2) can be seen.

The lower end of the strut (2) is connected to a lower element (39) of the foundation system, either the lower slab (4), a rib (3) or a peripheral beam (9) and delimiting a hollow and essentially triangular area between the central shaft (1), the lower slab (4) and each strut (2) (and, where appropriate, each rib (3)).

It should be noted that the lower slab (4) serving for supporting the central shaft (1) also aims to make integral the different struts (2) and/or ribs (3) and/or integral support pieces (15) for providing a greater stability to the system of the invention and spreading and distributing the load to the ground (12). Also, the main objective of the peripheral beam (9) is reducing the flexion of the lower slab (4) collected between the struts (2) and/or ribs (3) and/or integral support pieces (15).

Figure 5:
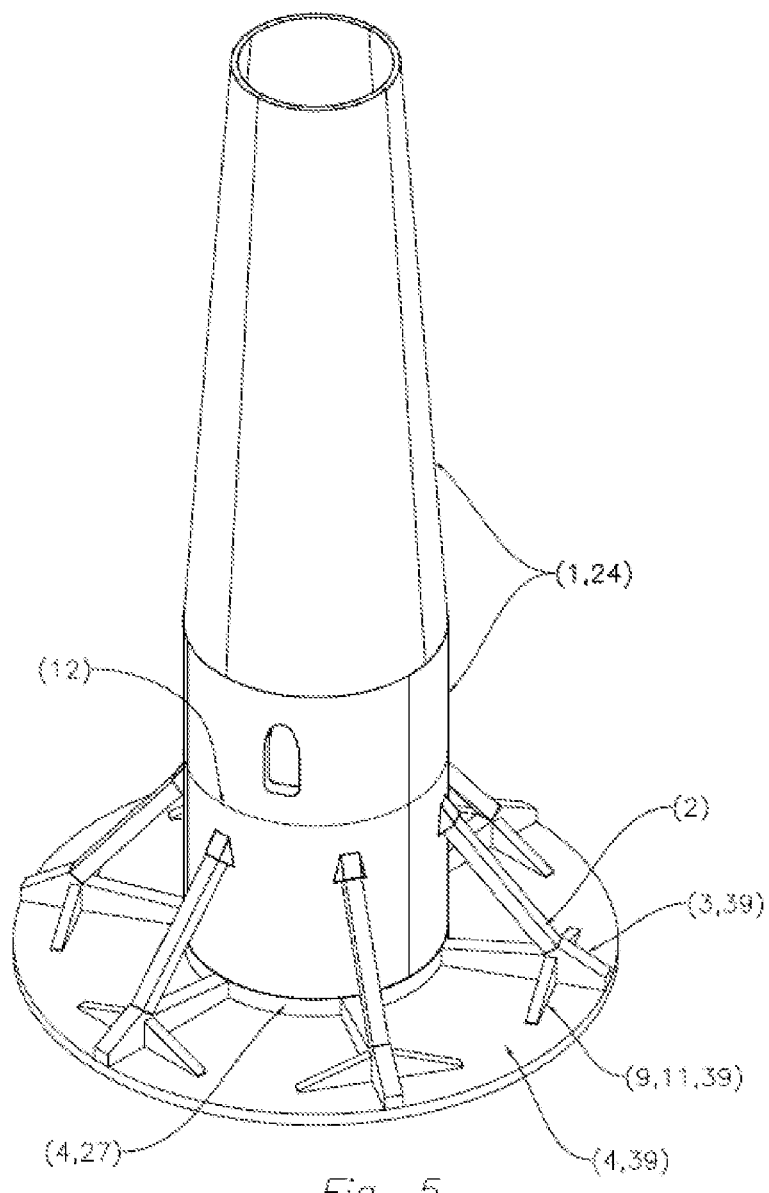
FIG. 5 illustrates a foundation system for towers according to the invention in which the lower slab comprises a central zone of increased thickness.

In FIG. 5 a foundation system for towers according to the invention is illustrated, in which the peripheral beams (9), in this case upper beams (11) are joined just to one rib (3) in addition to the lower slab (4).

In the embodiment illustrated in FIG. 5, the tower (24) is a tower of precast concrete, which has one or more essentially tubular sections formed by prefabricated dowels and the central shaft (1) which is buried in a length more than 2 m, can replace or take the place of the lower section of the tower (24).

Figure 6:
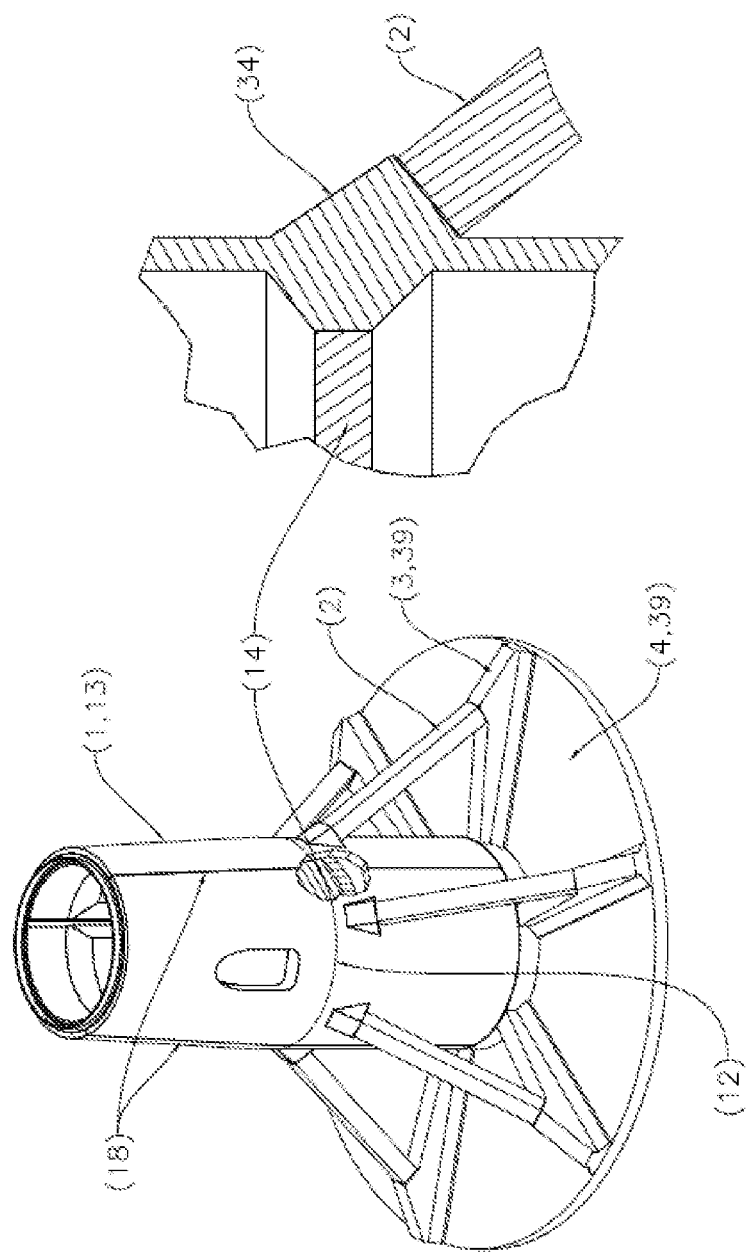
FIG. 6 shows a foundation system according to the invention comprising an upper closing slab.

In another preferred embodiment of the foundation system for towers, shown in FIG. 6, the central shaft (1) further comprises an upper closing slab (14), which in all or part of its perimeter is connected to the internal face of the wall of the central shaft (1), which in this case is hollow. The upper closing slab (14) limit sat the top a hollow space inside the central shaft (1), which is in turn limited at the bottom by the lower slab (4) and which is capable of being filled with ballast material. Preferably, this upper closing slab (14) is essentially flat and horizontal, made from in-situ or precast concrete, and it is placed at the level of the joints connecting the upper ends of the struts (2) and the central shaft (1).

In the embodiment shown in FIG. 6 is shown as in previous figures that the central shaft (1) extends above the level of the ground acting as a pedestal or lower tower section (24). In these cases, as shown in the figure, preferably the central shaft (1) maintain a cylindrical shape below the attachment level with the struts (2), and may instead adopt a frustoconical geometry, allowing to be adapted to the most appropriate diameters to adequately withstand the stresses and for its connection to the base of the tower (24).

Similarly, FIG. 6 shows that the section of the ribs (3) can adopt variable and irregular geometries, as in this case where the rib section (3) has inverted T shape for a better transfer of stresses with the lower slab (4).

Figure 7:
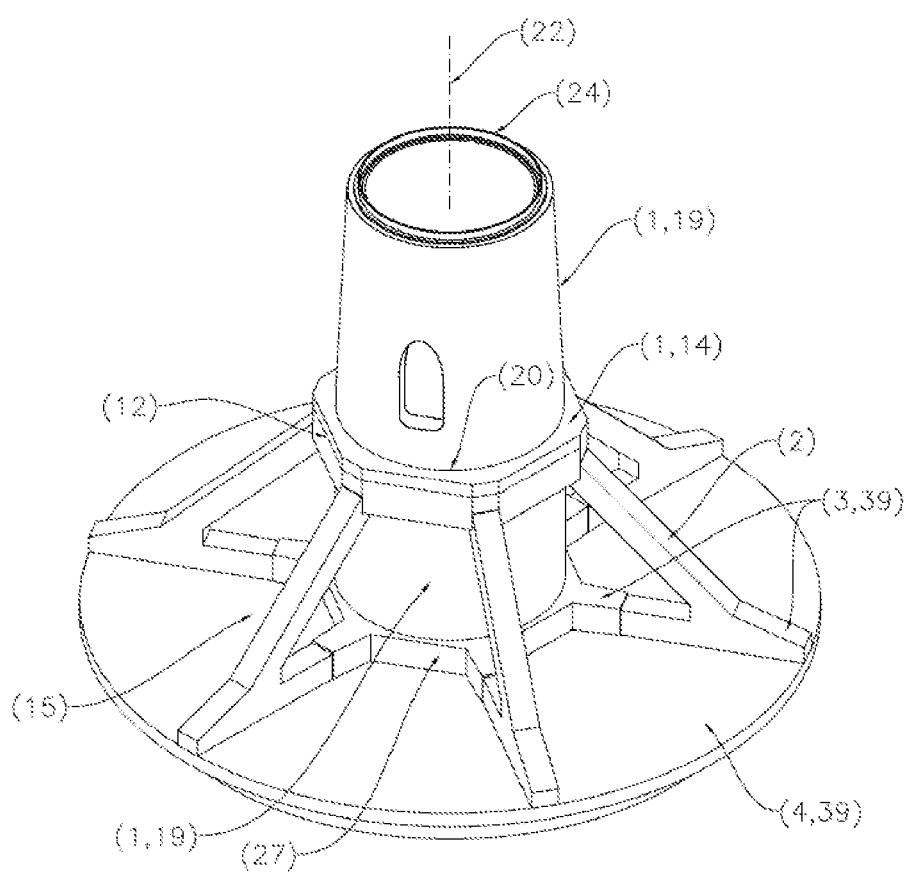
FIG. 7 shows an embodiment in which the central shaft comprises an upper closing slab and two prefabricated rings, one of which is located above the upper closing slab.

In FIG. 7 another preferred embodiment of the invention is shown, in which as in FIG. 6 the central shaft (1) is hollow, comprises an upper closing slab (14) and extends above the ground level as a pedestal of the tower (24). As in FIG. 6, the upper closing slab (14) transversely crosses inside the central shaft (1) and is at the same level than the upper ends of the struts (2) to which is joined.

Similarly, FIG. 7 shows that the central shaft (1) comprises two prefabricated rings (19) lying respectively above and below the upper closing slab (14) and forming the corresponding horizontal joints (20) in the central shaft (1). These rings are preferably prefabricated pieces, but they can also be built on site.

Figure 8:
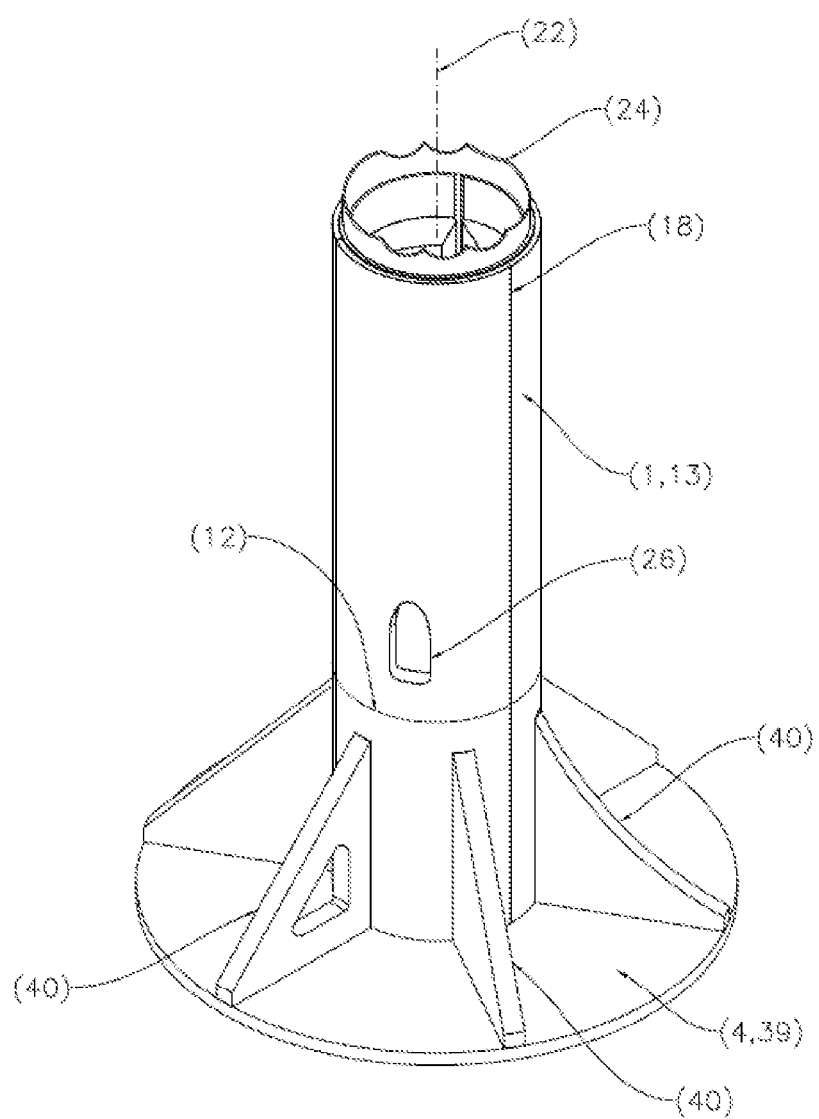
FIG. 8 shows an embodiment in which the central shaft is prefabricated and extends above the ground level as a pedestal for the tower, and in which said lateral support means are ribs.

In FIG. 8 an embodiment of the invention is shown, wherein the partially buried center shaft (1) is hollow and is formed from dowels (13) made of precast concrete, and wherein said lateral support means are ribs buried with linear joints of both the central shaft (1) and the lower slab (4).

Figure 9:
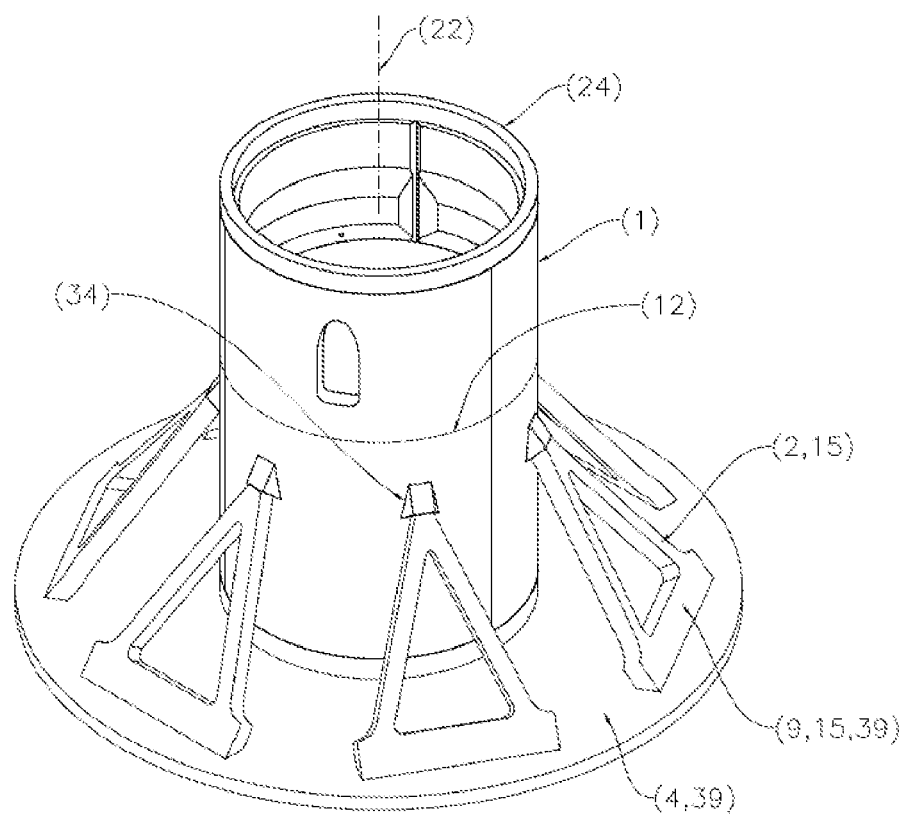
FIG. 9 shows an embodiment with integral support pieces comprising two struts and a peripheral beam.

In FIG. 9 another embodiment of the present invention is illustrated, in this case with integral support pieces (15) each comprising two struts (2) and a peripheral beam (9).

Figure 10:
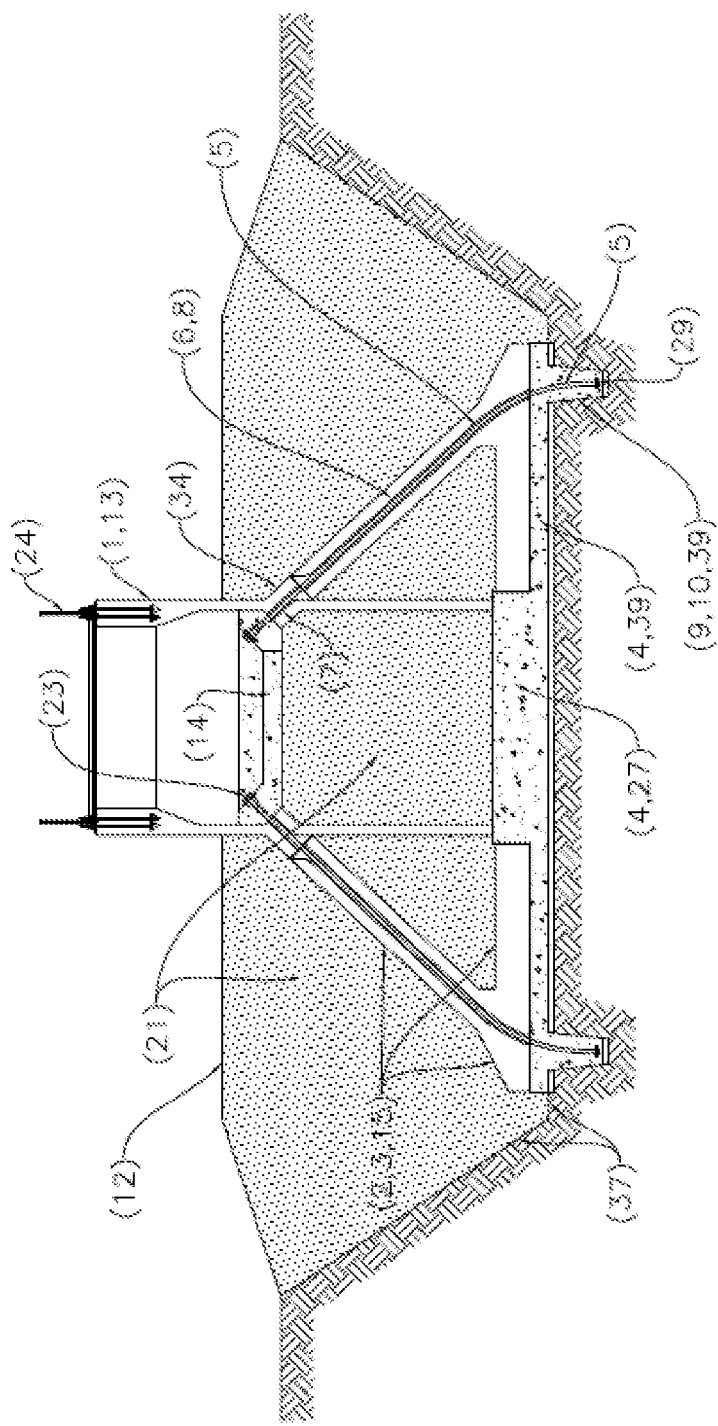
FIG. 10 shows a cross section of an embodiment in which a pre-stressing system for connecting the strut with the central shaft and with the lower elements of the foundation system is used.

In FIG. 10 another preferred embodiment of the foundation system for towers is shown, in which the joining of the integral support piece (15) with the central shaft (1) and with the lower elements (39) of the foundation system is made by a pre-stressing system. Said integral support piece (15) comprises in this case a strut (2) and a rib (3). Preferably, this pre-stressing system comprises at least one pre-stressing cable (5), or a pre-stressing bar, a part of which is housed in a sheath (6) of the strut (2), and enters inside the central shaft by another sheath (7) of the central shaft (1). This pre-stressing cable (5) lengthwise crosses the strut (2) and crosses the rib (3) through a sheath (8) for attaching the integral support piece (15) with the lower slab (4) and/or the peripheral beam (9).

The pre-stressing cable (5) of the pre-stressing system preferably crosses the wall of the central shaft (1), so that its upper end is connected to an anchorage (23) housed in the upper closing slab (14).

Similarly, the lower end of the pre-stressing cable (5) is connected to an anchorage (29) housed in a lower element (39) of the foundation system, in this case a lower peripheral beam (9,10).

In this FIG. 10 it can also be seen that the hollow central shaft (1) is filled with filler or ballast material (21).

Figure 11:
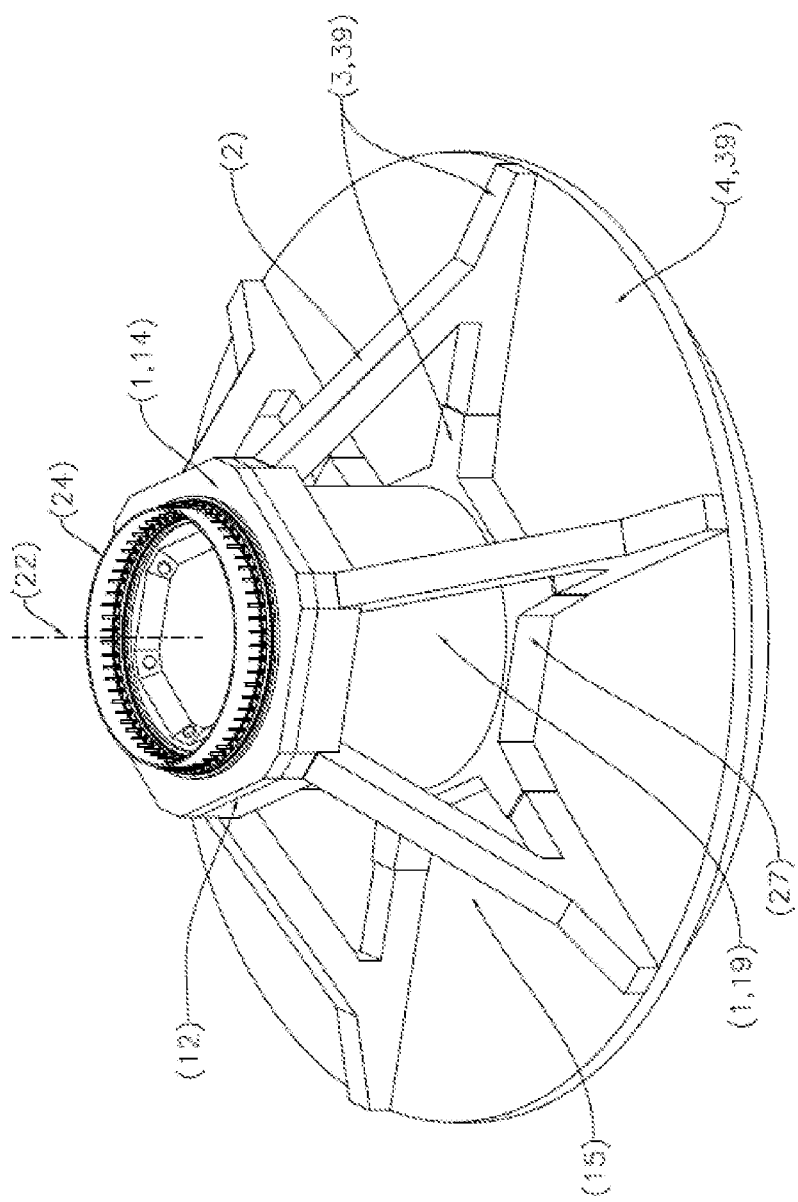
FIG. 11 shows an embodiment in which the central shaft comprises an upper closing slab, through which the connection with the tower is made.

FIG. 11 illustrates another preferred embodiment of the invention wherein the central shaft (1) comprises a prefabricated ring (19) and an upper closing slab (14) through which the central shaft connection is made with the tower (24) and the struts (2)

In FIG. 11 is also illustrated that a rib (3) may comprise different parts in the same linear element. In this case, each rib (3) has a farthest part from the axis of the tower that is prefabricated and forms part with a strut (2) of an integral supporting piece (15). In turn, each rib has another part closest to the axis of the tower which is connected with the area of increased thickness (27) of the lower slab and being built with in-situ concrete part, preferably as part of the concreting work of the lower slab (4).

Figure 12A:
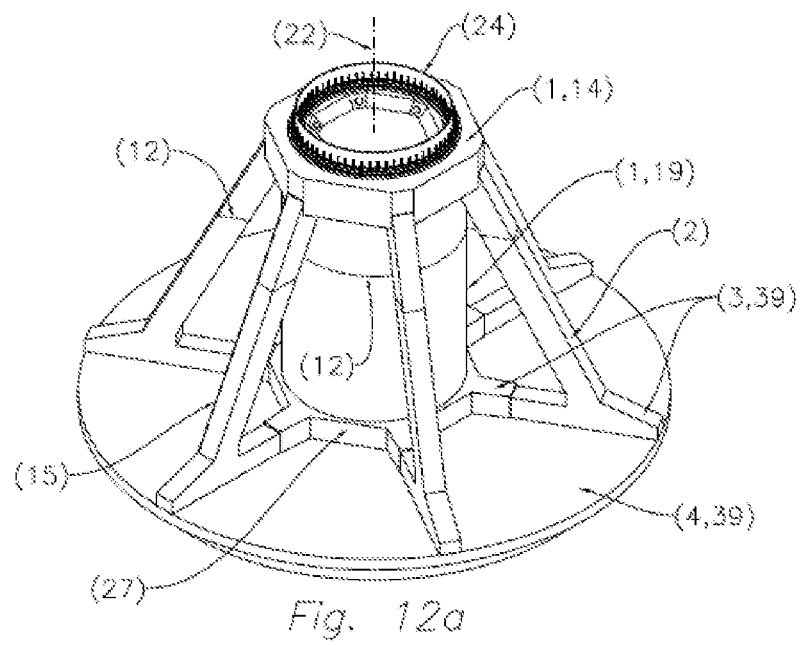
FIG. 12 shows an embodiment as in FIG. 11, wherein the central shaft and the struts extend above the ground level as a pedestal for the tower, with two alternatives with respect to the path of the pre-stressing cable.

In FIG. 12a is shown another preferred embodiment of the invention analogous to that described in FIG. 11, with the difference that in this case the length in which the central shaft extends above the ground level is increased, as a taller pedestal for a tower (24).

Figure 12B:
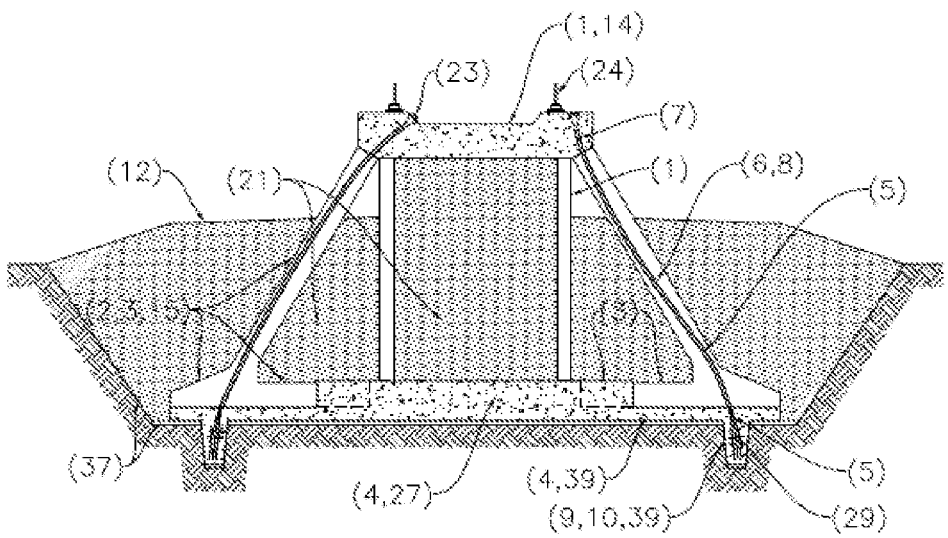

Similarly, in FIG. 12b is shown in cross section the embodiment shown in FIG. 12a, showing the pre-stressing system which contributes to the connection of the strut (2) with the central shaft (1,14) and with a lower element of the foundation system (39). The pre-stressing cable (5) is essentially parallel to the longitudinal axis of the strut, in the sense that it is placed longitudinally along the strut (2), but its layout can include certain twists or bends as shown in the figure, so that it is not exactly parallel to said axis. For example, two possible paths of said pre-stressing cable (5) are illustrated.

Figure 13:
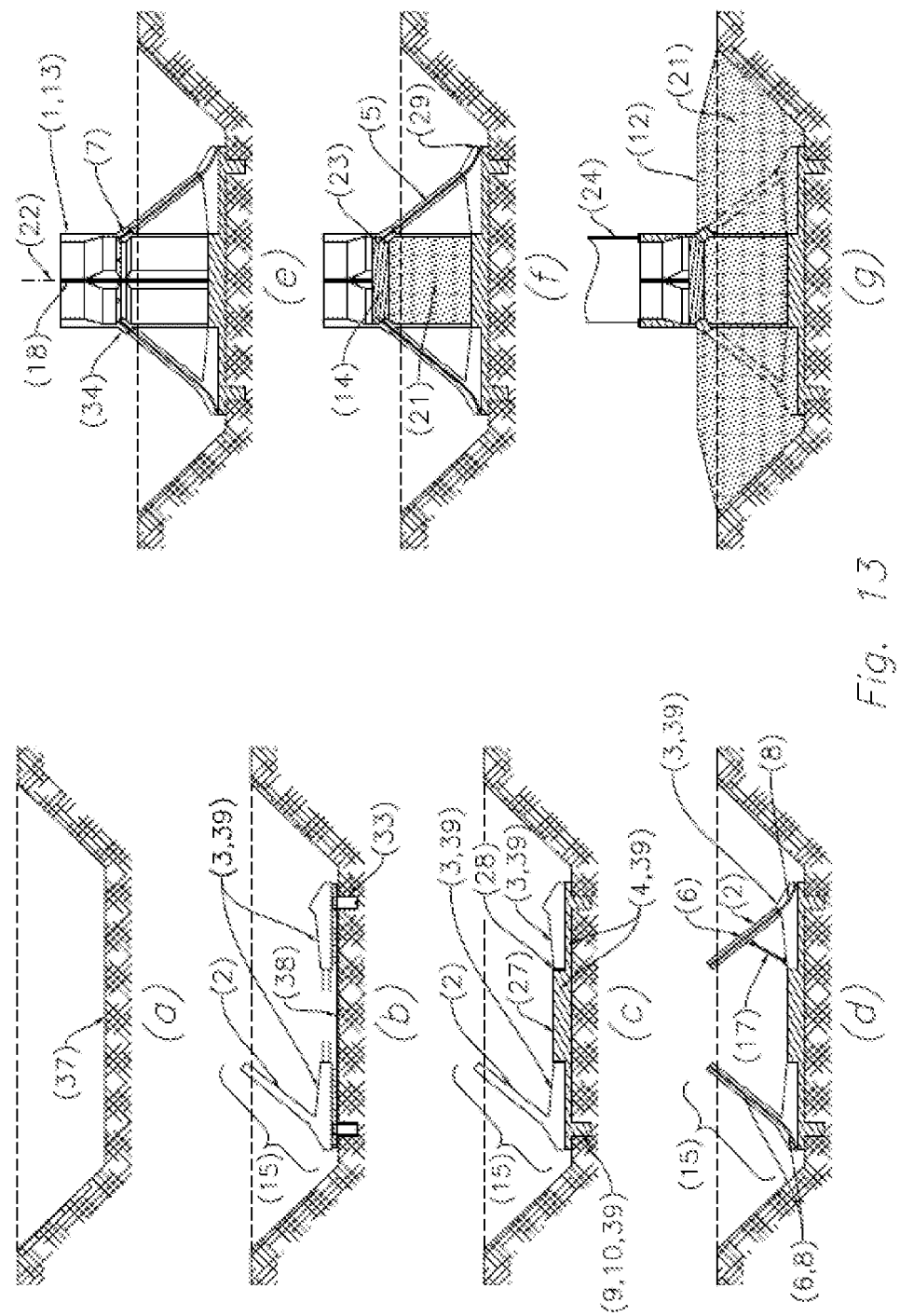
FIG. 13 shows several stages of an installation method of the foundation system according to the invention.

FIG. 13 shows various stages of a method for installing a foundation system of an embodiment according to the invention as shown in FIG. 10, in which, as discussed above, the order of steps is not the only one. Thus, in the numbered letters of the procedural steps set out in previous sections, FIG. 13A illustrates the step a). FIG. 13b illustrates the step b), step m) and a first stage of step h). FIG. 13c shows step i) and a second stage of step h). The following steps c) and e) are shown in FIG. 13e. Subsequently performed steps: g), k), l), q) (consisting of threading the pre-stressing cable (5), either top down or bottom up through the sheaths (6, 7, 8) provided on the elements that the pre-stressing cable (5) crosses) and r) (consisting of fixing the pre-stressing cable (5) to one of the anchorages (23,29), applying tension to the pre-stressing cable (5) and then fixing it to the other anchorage (23,29)) that are shown in FIG. 13f. Finally, FIG. 13g shows the installed condition of the foundation system after steps d) and f).

Specifically, FIG. 13a shows the excavation (37) and prior preparation of the ground.

FIG. 13b shows the steps of laying the rebar (38) of the lower slab and the peripheral beams (9) that in this case are made of in-situ concrete. For the execution of these peripheral beams a trench (33) can be dug, which acts as formwork against the ground during the concreting of that peripheral beam (9).

FIG. 13*b* also shows the process of placing the ribs (3) and the integral support pieces (15) comprising one strut (2) and one rib (3). In this case, all of them are made from precast concrete. For the placement of these elements adjustable support devices for adjusting their position may be employed. Also template means connecting with different prefabricated elements for controlling or maintaining a proper positioning can be used.

FIG. 13*c* shows the concreting step of the lower slab (4), which makes integral and fixes all the prefabricated elements previously placed. In this case, the lower slab (4) has a central zone with increased thickness (27), for which concrete template formwork elements (28) are used, acting as lateral formwork of the central increased thickness (27) and at the same time acts as a template element for positioning and/or fastening of the prefabricated pieces of the ribs (3) or the integral parts (15).

It must be noted that although in the method shown in FIG. 13 the concreting of the lower slab (4) is performed prior to the placement of the central shaft (1), it is possible to place the center shaft (1) before concreting, which may allow to adjust the position and fit the various prefabricated pieces before the concreting of the lower slab (4) that fixes them.

FIG. 13*d* shows a step of the installation method corresponding to the assembly of prefabricated pieces of the struts (2), to which positioning and clamping fastening struts (17) can be used. Furthermore, in the figure sheaths (6) and sheaths (8) are also illustrated, which are arranged on struts (2) and ribs (3) respectively, which allow the housing of the pre-stressing system for connecting said pieces with the central shaft (1) and/or the lower elements (39) of the foundation system.

FIG. 13*e* shows the assembly step of the central shaft (1) which in this embodiment consists of prefabricated sections (13) interconnected via vertical joints (18). The assembly of the central shaft (1) can be done mounting separately each dowel (13) in its final position, or can be done mounting previously the complete center shaft (1) in a different position to its final position, for mounting then said complete central shaft (1) into its final position. Previous assemblies of only part of the dowels or piece of the central shaft (1) can also be carried out in a different position to the final one.

FIG. 13*f* shows the embodiment after completion of the steps of positioning and tensioning of the pre-stressing cables (5), filling with ballast material (21) inside the central shaft (1) and implementation of the upper closing slab (14). The pre-stressing cable (5) has upper anchorage elements (23) at its lower part (29), which in this case are in the upper closing slab (14) and in a lower element (39), respectively.

Finally, FIG. 13*g* shows the installed condition of the foundation system, having disposed ballast material (21) above the lower slab (4), so that the lower slab and the other lower elements (39) of the foundation system are completely buried, and the central shaft (1) is partially buried. Also, the tower (24), in this case of tubular metal, is disposed and connected to the head of the central shaft (1).

Figure 14:
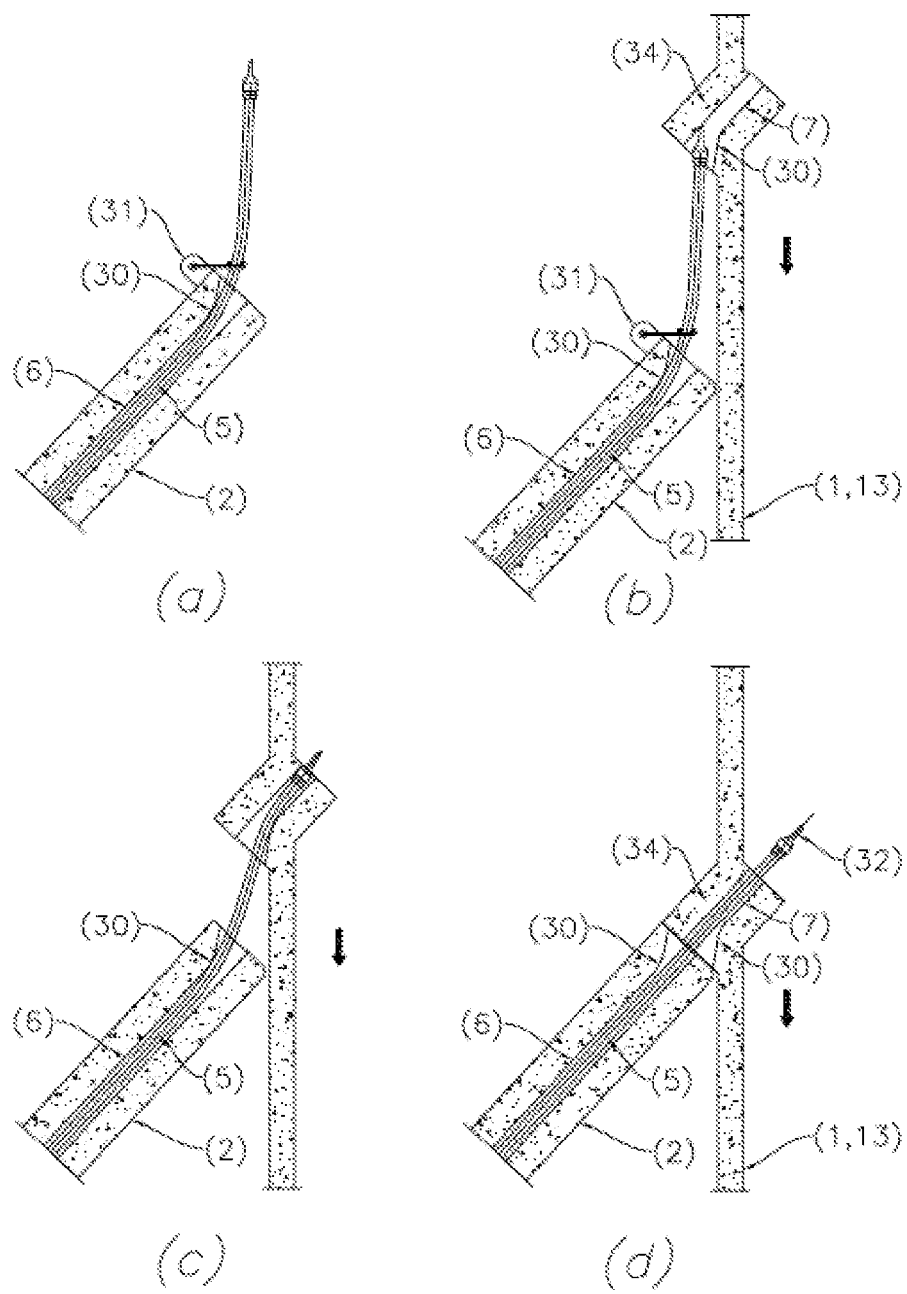
FIG. 14 shows a detail of the installation method of the pre-stressing system for connecting a strut to the central shaft of the foundation system.

FIG. 14 shows a step in the method for installing a foundation system according to the invention; specifically the threading process of a cable (5) of the pre-stressing system for connecting a strut (2) of precast concrete with a central shaft (1) also of precast concrete.

In FIG. 14*a* it can be seen that the cable (5) is prepositioned in a sheath (6) of the strut (2) so that its upper end protrudes. In this case, it has a curved opening (30) of the sheath (6) and with provisional securing means (31) of the pre-stressing cable, so that the cable can be provisionally maintained in a more vertical orientation than the axis of the strut (2).

This allows, as shown in FIG. 14*b*, the cable (5) to be inserted through a sheath (7) in the wall of the central shaft (1) during its mounting process. To this end, the sheath (7) comprises in turn another curved opening (30).

FIGS. 14*c* and 14*d* show the threading process of the cable, which in this case is assisted by the use of a guiding device (32); said device brings together the various strands that may be on the cable, and it has a pointing geometry and flexible material, which facilitates the threading process. The descent of the central shaft (1) or its pieces can conveniently be paused when threading the cable.

Figure 15:
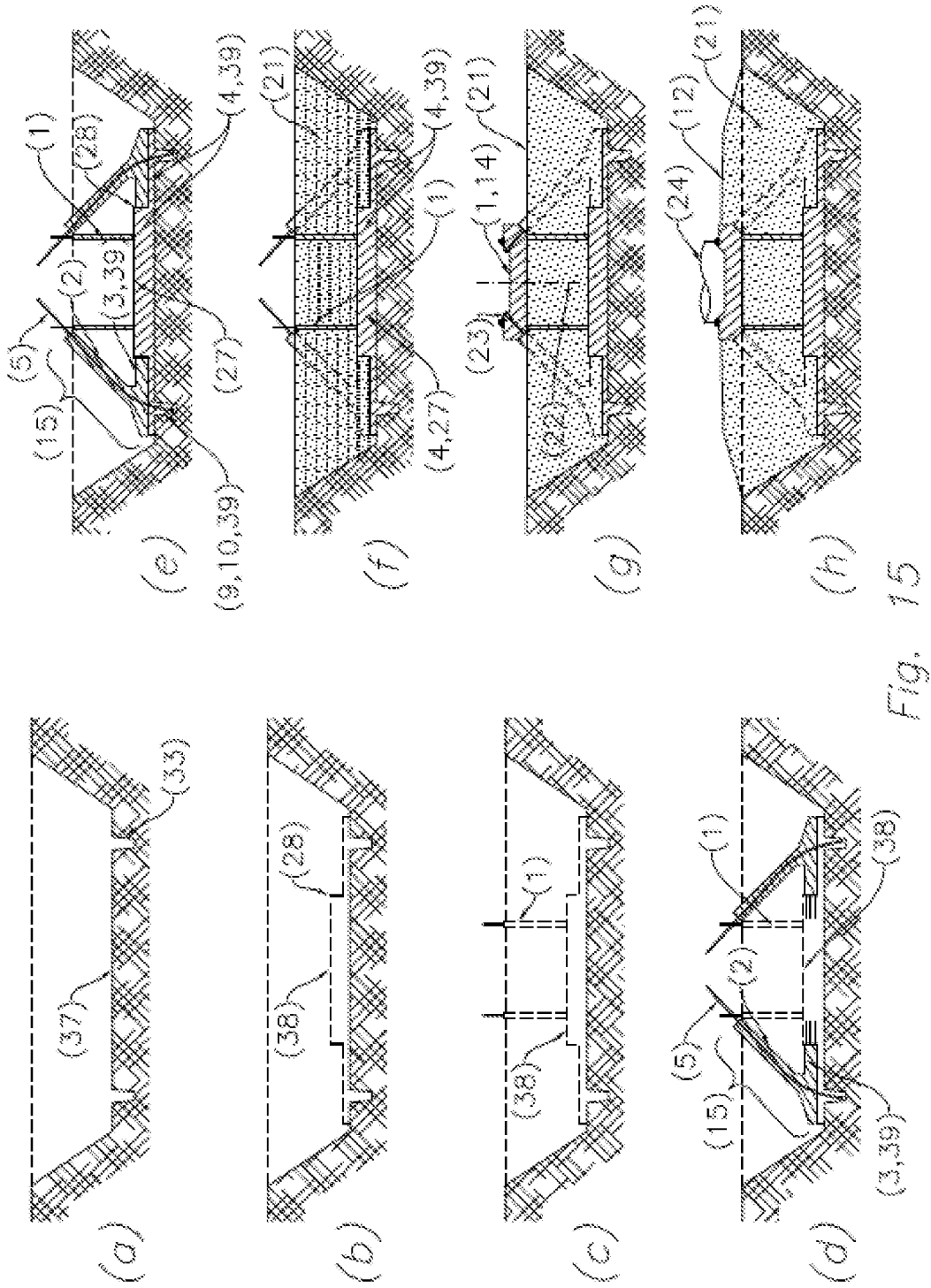
FIG. 15 shows several stages of an installation method of foundation system according to the invention.

FIG. 15 illustrates various phases of the construction method of a preferred embodiment of the foundation system according to the invention, in which the several steps can follow any technically feasible order.

Thus, following the numbered letters of the procedural steps set out in previous sections, FIG. 15*a* illustrates step a) and step m). FIG. 15*b* illustrates step b) and placing the formwork template (28). FIG. 15*c* shows step c) which in this case comprises a first phase of assembling or construction of the central shaft (1) consisting in placing the frame or rebar of the wall of said central shaft (1) which is hollow and is constructed in situ in this embodiment. FIG. 15*d* shows step h), showing the struts that in this case comprise pre-threaded pre-stressing cables (5). FIG. 15*e* shows steps i) and e), and a second phase of construction of the central shaft (1) consisting of the concreting of the walls. FIG. 15*f* illustrates step k) and a first phase in step d). In FIG. 15*g* takes place the last phase of construction of the central shaft to step l) and step g). Finally, FIG. 15*h* shows the installed condition of the foundation system after a second phase of step d) and step f).

Figure 16:
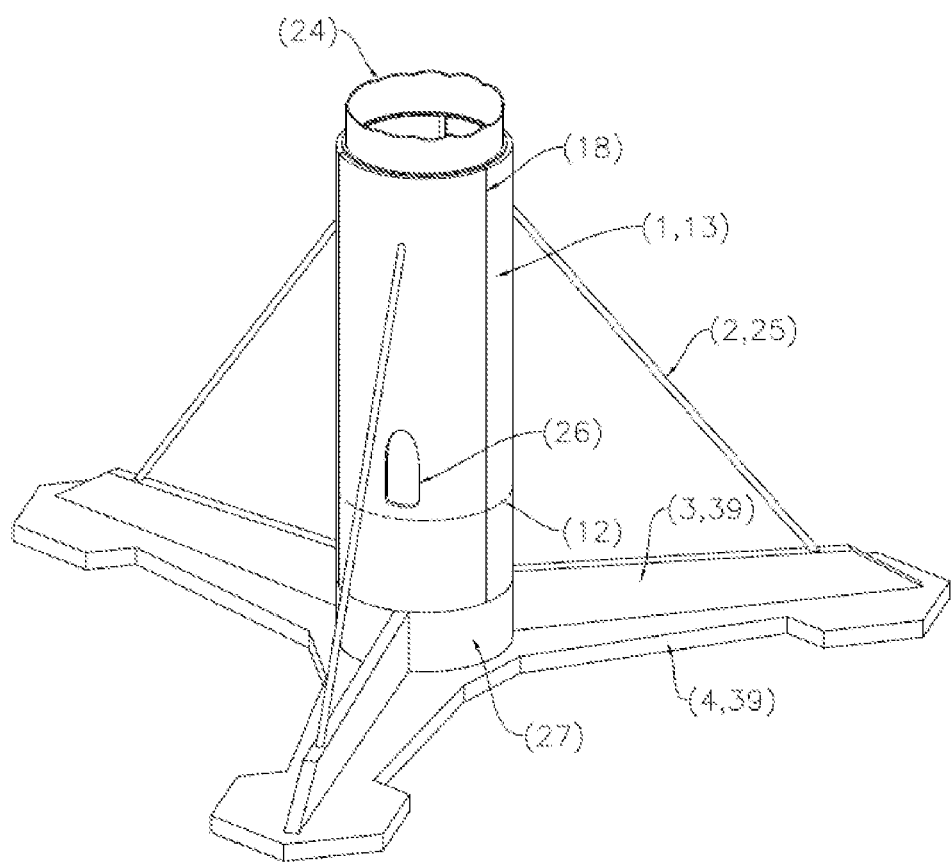
FIG. 16 shows an embodiment with a polygonal and star geometry of the lower slab and pre-stressed strap type struts.
Figure 17:
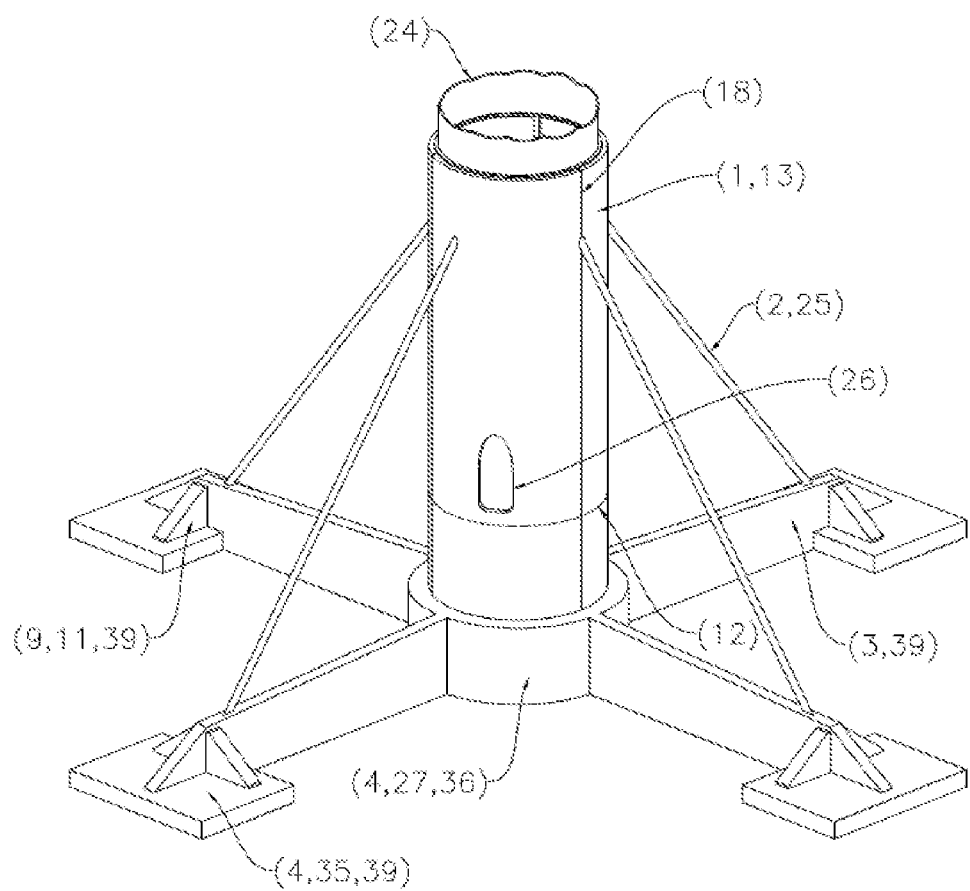
FIG. 17 shows an embodiment with a lower slab comprising a central module and four external modules with pre-stressed strap type struts.

Finally, FIGS. 16 and 17 show embodiments of the invention in which the support members are in the form of struts (2) of pre-stressed strap (25) type; in both cases such prefabricated strap type struts (25) consist of cable whose upper end is connected to the central shaft (1) and whose lower end is connected to a lower element (39) of the foundation system, namely a rib (3). Alternatively the upper end can be attached to the tower (24) and the lower end can be directly connected to the ground by anchoring means known in the art. The central shaft (1) is partially buried and is constructed using precast concrete dowels.

The strap type struts (25) are pre-stressed, the lower slab (4) having preferably a high weight of lands on it, in particular in the connection area with the lower ends said strap type struts (25) so that the weight of said lands compensate at least partly the upward traction forces that said pre-stressed anchorages (25) transmit to the lower slab (4).

The lower slab (4) in FIG. 16 adopts a polygonal star-shaped geometry. In FIG. 17 the lower slab (4) comprises a central module (36) located below the central shaft (1) and four exempt modules (35) separated from the central module (36) which are furthest from the vertical axis of the tower (22) than the central module (36) and that are connected with the central module (36) by ribs (3).

The invention claimed is:

1. A foundation system for towers, comprising:
   a central shaft placed below a base of tower so that a central vertical axis of the central shaft is essentially coincident with a vertical axis of the tower, and the central shaft is totally or partially buried in an installed condition, a lower slab made essentially of reinforced or pre-stressed concrete, placed below the central shaft so that it is fully buried in an installed condition and whose configuration is essentially flat, so that the maximum horizontal dimension exceeds its maximum vertical dimension, and a lateral support, which is totally or partially buried in an installed condition, and comprises at least three struts connected at their upper end to the central shaft or the tower and connected at their lower end to the lower slab, said struts having a linear or inclined configuration, whose longitudinal dimension exceeds the maximum transverse dimension and both ends are at different levels, such that the upper end is closer to the vertical axis of the tower than the lower end, wherein a connection between at least one of the struts and the central shaft or the tower comprises at least one pre-stressing cable, a part of which is housed in a sheath of the strut attached by the connection, said sheath being essentially parallel to a longitudinal axis of said strut attached by the connection;

wherein said pre-stressing cable penetrates inside the central shaft or the tower, thereby connecting the strut and the central shaft or the tower at a level of said shaft or the tower which, in the installed condition of the foundation, is above the ground, wherein the central shaft is hallow and comprises a substantially horizontal and flat upper closing slab, which remains connected with a wall of the central shaft and that is prefabricated or built in-situ with concrete, steel, or a combination thereof; and wherein a hollow space inside the central shaft is delimited at the top by said upper closing slab, which is in turn delimited at the bottom by the lower slab and that can be filled with ballast material, wherein the level or height of said upper closing slab is essentially coincident with the level or height of at least one protrusion connecting the upper end of one of the at least three struts and the central shaft, wherein the struts, the lower slab and any of the shaft or the tower are arranged such that they define a hollow area therebetween that can be filled, completely or partially, with ballast material to be disposed on the lower slab to provide weight to the assembly, and wherein the hollow area coincides with a plane defined by the longitudinal axis of the strut and the vertical axis of the tower, and wherein an area in which the hollow area coincides with the plane defined by the longitudinal axis of the strut and the vertical axis of the tower can be filled with the ballast material to be disposed on the lower slab.

2. The foundation system for towers according to claim 1 further comprising at least one rib having linear configuration, with two ends and whose maximum longitudinal dimension is greater than its maximum transverse dimension, which remains attached to the lower end of at least one of the struts and the lower slab and which projects laterally so that at least one end is furthest from the vertical axis of the tower than the rest of non-end points of the at least one rib.

3. The foundation system for towers according to claim 1 further comprising at least one peripheral, top or bottom beam of linear configuration and whose maximum longitudinal dimension is greater than its maximum transverse dimension, which remains attached to the lower slab and to at least one rib or one of the at least three struts; said peripheral beam being arranged essentially circumferentially such that is kept apart from the central shaft and its position in relation to the center of the lower slab is not radial.

4. The foundation system according to claim 1, wherein the lower end of at least one of the at least three struts remains connected to at least one lower element of the foundation system, which is selected from the group consisting of lower slab, at least one rib, and a peripheral beam, delimiting one essentially triangular and hollow area which is situated between the central shaft, the lower slab and each of the at least three struts.

5. The foundation system for towers according to claim 1, wherein at least one member selected from the group consisting of at least one strut of the at least three struts, at least one rib, and a peripheral beam is integrated in a single integral support piece which is connected to the central shaft or the tower by joints.

6. The foundation system for towers according to claim 5, wherein the pre-stressing cable longitudinally crosses the one of the at least three struts and is used for attaching the lower end of one of the at least three struts or the integral support piece with at least one lower element of the foundation system.

7. The foundation system for towers according to claim 1, wherein the lower end of one of the at least three struts or an integral support piece containing said one of the at least three struts is connected to at least one lower element of the foundation system, which is selected from the group consisting of the lower slab, at least one rib, and a peripheral beam, via at least one protrusion and pre-stressing system comprising the at least one pre-stressing cable, a part of which is housed in the sheath of the one of the at least three struts which is essentially parallel to the longitudinal axis of said one of the at least three struts; and wherein said pre-stressing cable penetrates into said at least one lower element across the surface of the at least one protrusion between said lower structural element and the lower end of the one of the at least three struts or between said at least one lower element and the integral support piece containing said one of the at least three struts; wherein an anchorage of the lower end of the pre-stressing cable is housed in the at least one lower element of the foundation system.

8. A wind turbine and/or wind tower employing a foundation system according to claim 1.

9. The foundation system for towers according to claim 1, wherein the struts are strap-type tensioning struts.

10. A method for installing a foundation system for towers wherein the foundation system for towers comprises:

a central shaft placed below a base of tower so that a central vertical axis of the central shaft is essentially coincident with a vertical axis of the tower, and the central shaft is totally or partially buried in an installed condition, a lower slab made essentially of reinforced or pre-stressed concrete, placed below the central shaft so that it is fully buried in an installed condition and whose configuration is essentially flat, so that the maximum horizontal dimension exceeds its maximum vertical dimension, and a lateral support, which is totally or partially buried in an installed condition, and comprises at least three struts connected at their upper end to the central shaft or the tower and connected at their lower end to the lower slab, said struts having a linear or inclined configuration, whose longitudinal dimension exceeds the maximum transverse dimension and both ends are at different levels, such that the upper end is closer to the vertical axis of the tower than the lower end, wherein a connection between at least one of the struts and the central shaft or the tower comprises at least one pre-stressing cable, a part of which is housed in a sheath of the strut attached by the connection, said sheath being essentially parallel to a longitudinal axis of said strut attached by the connection;

wherein said pre-stressing cable penetrates inside the central shaft or the tower, thereby connecting the strut and the central shaft or the tower at a level of said shaft or the tower which, in the installed condition of the foundation, is above the ground, wherein the central shaft is hallow and comprises a substantially horizontal and flat upper closing slab, which remains connected with a wall of the central shaft and that is prefabricated or built in-situ with concrete, steel, or a combination thereof; and wherein a hollow space inside the central shaft is delimited at the top by said upper closing slab, which is in turn delimited at the bottom by the lower slab and that can be filled with ballast material, wherein the level or height of said upper closing slab is essentially coincident with the level or height of at least one protrusion connecting the upper end of one of the at least three struts and the central shaft, wherein the struts, the lower slab and any of the shaft or the tower are arranged such that they define a hollow area therebetween that can be filled, completely or partially, with ballast material to be disposed on the lower slab to provide weight to the assembly, and wherein the hollow area coincides with a plane defined by the longitudinal axis of the strut and the vertical axis of the tower, and wherein an area in which the hollow area coincides with the plane defined by the longitudinal axis of the strut and the vertical axis of the tower can be filled with the ballast material to be disposed on the lower slab, wherein the method comprises in any technically possible order the following steps:

a) Excavating and preparing the ground for supporting the foundation;

b) Placement of passive or active (pre-stressed) armor containing the lower slab, either by separated elements or by modules or rebar cages (armor) previously pre-assembled;

c) Construction or installation of at least part of the central shaft;

d) Filling with soil on the lower slab until it is completely buried;

and further comprising, after step c) and in any order, the steps:

e) Connecting the central shaft with the lower slab;

f) Connecting the tower with the central shaft;

g) Connecting the at least three struts with the central shaft or with the tower;

and wherein further comprises, before step g), the step of:

h) Constructing or mounting the at least three struts and at least one rib or a peripheral beam;

and further comprising, after step b) and before step d), the step:

i) Concreting the lower slab.

11. The installation method according to claim 10 of a foundation system for towers comprising at least one pre-fabricated element either the at least three struts, the at least one rib, the peripheral beam, parts of the central shaft, wherein the method further comprises, before step d), the step:

j) Prefabrication and transportation to the site of the at least one prefabricated element of the foundation system.

12. The installation method according to claim 10 of a foundation system for towers comprising the at least one rib or the peripheral beam located below the lower slab, wherein the method further comprises, before step i), step of:

m) Digging at least one trench at the excavation bottom of the foundation system for receiving the at least one rib or the peripheral beam, said trench being susceptible of acting as formwork against the ground if said at least one rib or the peripheral beam is constructed from in-situ concrete.

13. The installation method according to claim 10, wherein the at least one rib or integral parts of the at least one rib are prefabricated, and the method further comprises, before step i), the step of:

n) placing template formwork acting as lateral formwork in the central zone with increased thickness (or the central shaft constructed from in-situ concrete), wherein time acts as a template element for positioning or fastening of the prefabricated at least one rib or the prefabricated integral parts comprising said at least one rib.

14. The installation method according to claim 10 of a foundation system for towers comprising the pre-stressing system for joining the at least one strut of the at least three struts or an integral support piece which integrates said at least one strut of the at least three strut, with the central shaft and with at least one lower element of the foundation system, either the lower slab, at least one rib or a peripheral beam, said pre-stressing system comprising at least:

the pre-stressing cable that in an installed condition longitudinally crosses said at least one strut of the at least three struts, so that its upper end protrudes from the at least one strut of the at least three struts and penetrates into the central shaft or inside the upper closing slab of the central shaft, and its lower end protrudes from said strut and penetrates into a lower element of the foundation system;

wherein the sheath that houses part of the at least one pre-stressing cable longitudinally crosses said at least one strut of the at least three struts and in a final status houses part of said pre-stressing cable;

an anchorage of the upper end of the pre-stressing cable which is placed in the central shaft upper closing slab of the central shaft;

a second sheath, with one or several aligned sections, which allows the passage of the pre-stressing cable from the upper end of said strut to said anchorage through the central shaft or the upper closing slab;

an anchorage of the lower end of the pre-stressing cable which is placed at a lower element of the foundation system;

a third sheath, with one or several aligned sections, which allows the passage of the pre-stressing cable from the lower end of said at least one strut of the at least three struts to said anchorage through at least one lower element of the foundation system which may or may not be integrated with said strut at an integral support piece;

said method being wherein it further comprises, after step h), the steps of:

q) threading said pre-stressing cable, either top-down or bottom-up, through the sheath, the second sheath, and the third sheath provided in the element the cable crosses;

r) fixing the pre-stressing cable to one of said anchorages, applying tension to the pre-stressing cable, and then fixing the other anchorage;

s) optionally, filling at least part of the sheath, the second sheath, or the third sheath with material for protecting the pre-stressing cable or for its adherence to the elements it crosses.

15. The foundation system for towers according to claim 1, wherein the hollow area is triangular.

* * * * *

UNITED STATES PATENT AND TRADEMARK OFFICE
CERTIFICATE OF CORRECTION

PATENT NO. : 10,822,765 B2
APPLICATION NO. : 15/316459
DATED : November 3, 2020
INVENTOR(S) : Jose Salustiano Serna Garcia-Conde Page 1 of 1

It is certified that error appears in the above-identified patent and that said Letters Patent is hereby corrected as shown below:

In the Claims

Column 18, Claim 11, Line 1, after "beam,", insert --or--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*